United States Patent Office.

JOSEPH EVES HOVER, OF PHILADELPHIA, PENNSYLVANIA.

Letters Patent No. 107,910, dated October 4, 1870.

IMPROVEMENT IN CEMENTS FOR PAVING AND BUILDING.

The Schedule referred to in these Letters Patent and making part of the same.

I, JOSEPH EVES HOVER, of the city of Philadelphia and State of Pennsylvania, have invented an Improved Paving and Building Cement, of which the following is a specification.

The nature of my invention consists in the combination of resin and coal-ashes, to form a strong, durable, and cheap cement, to be used for paving, building, or other purposes. To these ingredients, which I mix together as hereinafter described, I sometimes add a portion of grease, to increase the toughness of the composition, varying the proportions as circumstances may require. Coloring matter may be mixed with the cement, to give it any desired color.

To enable others to make and use my invention, I will now give a full description thereof.

I take equal or variable proportions of resin and coal-ashes. The resin I melt in a kettle or other suitable vessel, and gradually add thereto the ashes, stirring the melted resin at the same time, by any convenient mode, to insure a uniform mixture of the two substances.

I sometimes add a small quantity of grease to the composition, to increase its toughness, varying the proportions as circumstances may require.

I give it any desirable color by the addition of suitable coloring matter.

I manufacture the cement in blocks, or slabs, or any other convenient form suitable for its particular use, or else manufacture it in bulk for transportation, to be remelted and brought into the required form when used; or the cement may be made from the crude materials at the place it is used.

What I claim as new, and desire to secure by Letters Patent, is—

The composition of resin and coal-ashes, with or without the admixture of grease, substantially as described.

In testimony that the above is my invention, I have hereto set my hand and affixed my seal this 8th day of July, 1870.

JOSEPH EVES HOVER. [L. S.]

Witnesses:
THOMAS J. BEWLEY,
STEPHEN USTICK.